2,829,124
EPOXIDE RESIN

August Napravnik, Hightstown, N. J., and David J. Lieb, Bainbridge, N. Y., assignors to The Borden Company, a corporation of New Jersey No Drawing. Application December 23, 1955
Serial No. 554,928

5 Claims. (Cl. 260—60)

This invention relates to an epoxy resin and the process of making it.

The invention is a continuation in part of our application Serial No. 349,082, filed April 15, 1953, now abandoned.

The invention provides an epoxy resin prepared from an intermediate consisting of a phenol-formaldehyde condensation product of controlled low condensation and low molecular weight, the epoxy resin combining the generally opposed properties of fluidity or fusibility as made with exceptional resistance to heat after curing.

Briefly stated, the invention comprises the process of and the product resulting from forming a solution of phenol in water containing an acidic condensation catalyst, introducing formaldehyde into the said solution in warmed condition and at a slow rate of the order of that of condensation of the formaldehyde with the phenol, discontinuing the addition of the formaldehyde when the total formaldehyde introduced is 0.3–0.9 mole for 1 mole of the phenol used, then neutralizing the acidic catalyst, and reacting the condensate so made with a haloepoxy-alkane in an alkaline medium. In the commercial embodiment of the invention, the said condensate is subjected to steam distillation at reduced pressure to remove free, unreacted phenol before the epoxy compound is introduced.

As to materials used, we know of no satisfactory substitutes for phenol and formaldehyde as the reactants in making the intermediate that gives our final product the desired combination of normally inconsistent properties. The phenol may be used, however, in any one of its customary forms, as for instance U. S. P., commercial 90%, or other grades that are commonly employed in making phenoplasts. The aldehyde may be introduced as a gas, as an aqueous solution of it such as the 37% or 44% solutions of commerce, or as paraformaldehyde.

The haloepoxyalkane which is reacted with the phenol-formaldehyde condensate, serving as the intermediate, is a compound of the class illustrated by epichlorohydrin, alpha-glycerol - dichlorohydrin, or 3 - chloro-1,2-epoxy-butane.

The catalyst used for the initial condensation is acidic. Examples are sulfuric, phosphoric, and benzene and toluene sulfonic acids, and boron trifluoride-ethyl etherate.

We ordinarily use an organic, water insoluble or difficulty soluble liquid to dissolve the intermediate condensate of phenol and formaldehyde. Examples of such solvents that may be used are methyl ethyl ketone, diethyl ketone, butanol, and dibutyl ether.

At the time of reaction of the haloepoxyalkane with the condensate, we use a water-soluble alkali, as for instance, any alkali metal hydroxide. There is no advantage in using the corresponding carbonates or the amines.

As to proportions, we introduce about 0.5 mole of formaldehyde for each mole of the phenol and the catalyst of condensation of these materials in amount to establish the pH of the condensation mixture at the start at 0.5. However, the proportions may be varied, as within the range 0.3–0.9 mole of the formaldehyde to 1 mole of phenol and the catalyst in amount to establish the pH within the range 0.2–2.

The epichlorohydrin or the alternative therefor is used in the proportion of 1–7 moles for 1 mole of phenol.

The non-reactive solvent, such as water, which is used to dilute the phenol before the addition of the formaldehyde is begun, is in the proportion to dissolve the phenol at reaction temperatures and is suitably 100 parts for 1 mole of the phenol. A satisfactory range of water is 50–200 parts although amounts in excess of 100 parts are ordinarily unnecessary. These proportions may be varied to the extent necessary to keep approximately these ranges of total water after the introduction of aqueous formaldehyde. Formaldehyde in the proportion of 0.5 mole introduced in 44% solution, for example, provides 19 parts of water.

The proportion of alkali used in the reaction of the epoxy compound with the phenol-formaldehyde condensate is 1 mole for each atom of chlorine to be removed as chloride in the reaction.

As to conditions, it is important that the formaldehyde be introduced after the dilution of the phenol and also slowly, as for instance, at substantially the rate at which it reacts with the phenol. This means that the proportion of free formaldehyde in the solution is at a minimum at all times and is ordinarily less than 0.5%–1% in concentration. To obtain such minimum concentration of free formaldehyde, the time of addition of it to the diluted phenol solution is long, as, for instance, 2–6 hours.

The temperature at which the formaldehyde is condensed with the diluted phenol is elevated but is kept relatively low, as within the range 60°–90° C. and in usual commercial operation at a maximum of approximately 80° C.

After the condensation under these controlled conditions is effected, then for best results we distil out unreacted phenol. In this term we include by definition not only free phenol itself but also low reaction products or threshold condensates of such relatively simple molecular structure as to make them volatile in steam under our conditions, namely, about 40°–80° C. at reduced pressure such as 60 mm. of mercury or less. The temperature within this range will be lower at the beginning than at the end of the distillation. To prevent the temperature from rising above about 80° C., we introduce steam or water as the distillation proceeds, so that the operation is in fact steam distillation throughout. Distillation is continued until the removal of unreacted phenol is substantially complete as shown by the content thereof (including the low condensates) coming to be substantially constant in the mixture remaining in the still. In a representative run, this required the introduction, during this steam distillation, of approximately 300–350 parts of water for 1 mole of phenol. This means 300–350 grams of water for 94 grams of the phenol.

Using the materials and conditions stated above, we obtained a finished epoxy resin that is different from what has been made heretofore. The process gives consistently and dependably a product that is a viscous liquid at room temperature. When cured with an amine or other conventional curing agent for epoxide resins, however, the product is a solid that exhibits unusual heat stability, that is, non-thermoplasticity. Thus the cured material, when subjected to temperatures up to 80° C. or so, shows only a slight decrease in tensile strength, whereas comparable epoxy resins made heretofore by processes that are comparable except for the new features emphasized herein show a large loss in strength at such temperature. A representative cured resin, made from the special phenol-formaldehyde intermediate described above, showed a shear strength at 82° C. approximately twice that for a resin made from the same chemical materials, but without the predilution of the phenol, the subsequent slow addition of the formaldehyde to the diluted solution, and the steam vacuum distillation as described above.

The invention will be further illustrated by description in connection with the following specific examples of the practice of it. In these examples and elsewhere herein, proportions are expressed as parts by weight unless specifically stated to the contrary.

*Example 1*

94 parts of U.S.P. phenol (1 mole) and 94 of water were charged into a reactor. 2.9 parts of concentrated sulfuric acid (96.6%) were added, to give pH 0.5. The acidified solution was heated to 80° C. Then 34.1 parts of 44% aqueous solution of formaldehyde (0.5 mole) were added to the stirred acidified solution, over a period of 4 hours, while the temperature was maintained at 80° C.

Upon the completion of the formaldehyde addition, the temperature was maintained at 80° C. for an additional period of a half hour, after which 4 parts of sodium carbonate were added to neutralize the acid. The system was then placed under vacuum at a pressure of 30 mm. mercury and water distilled therefrom by heating until the temperature reached 80° C. At this point, additional water was then added slowly to the system at a rate such that the distillation temperature was maintained at approximately 80° C. The water addition and distillation was continued until the total distillate collected amounted to 315 parts.

25 parts of the condensate representing the still residue were then dissolved in 37.5 parts of methyl ethyl ketone and 40.5 parts (ca. 0.44 mole) of epichlorohydrin. The resulting solution was then heated, 20 parts of 50% sodium hydroxide solution (0.25 mole) were added gradually with stirring and over a period of 4 hours to the warmed solution at about 80° C. At the completion of this addition, the temperature was maintained at 80° C. for an additional half hour.

The aqueous layer containing salt was then withdrawn from the bottom of the reactor and separated from the upper organic layer containing the resin. This organic layer was then washed with water, to complete the removal of salt, and the aqueous layer again separated. The washed organic layer was then distilled only until the methyl ethyl ketone solvent had been largely removed. The remaining epoxy resin was then withdrawn from the reactor.

The epoxy resin so made was a clear amber colored viscous liquid. It was soluble in acetone and like organic solvents.

100 parts of the epoxy resin were mixed with 10 parts of diethylenetriamine as curing agent. This mixture went into the gel state at room temperature in a period of 20 minutes. It was then infusible and insoluble in conventional type solvents as, for instance, hydrocarbon liquids, acetone, esters and the like. Representative resins thus made do not become fluid at temperatures of 150° C. or somewhat higher.

The above procedure is followed, in a modification of this example, except that the methyl ethyl ketone is omitted. The use of the methyl ethyl ketone or like solvent is helpful, however, in extracting the organic materials into a phase separate from the water present and from the byproduct sodium chloride that collects in the aqueous phase.

*Example 2*

For showing by contrast our unexpected result, there is now given the preparation and properties of a resin made in conventional manner.

This conventional resin was made by condensing 1 mole of phenol with 0.82 mole of formaldehyde with 1% of sulfuric acid as catalyst on the weight of the phenol. The phenol, all the formaldehyde, and catalyst were mixed at the start of the reaction, brought to reflux temperature, held there for approximately half an hour, and then distilled at atmospheric pressure until a liquid temperature of approximately 150° C. was reached.

200 parts of the resin (still residue) so made were dissolved in methyl ethyl ketone with 324 parts of epichlorohydrin. This solution was heated to a temperature of 80° C., whereupon 320 parts of 25% sodium hydroxide were weighed out for addition at a rate of 80 parts per hour over a 4-hour period while the temperature was maintained at 80° C. After a period of 2 hours and 40 minutes, when only 67% of the total calculated amount of sodium hydroxide had been added, the resinous product went to a gel and proved to be insoluble and infusible.

*Example 3*

The procedure of the Example 1 above is followed except that there is substituted, for the epichlorohydrin there used, an equimolecular proportion of alpha-glycerol dichlorohydrin and, in another preparation, an equimolecular proportion of 3-chloro-1,2-epoxybutane. In this example, the proportion of sodium hydroxide used is doubled over the amount shown in Example 1, when the dichlorohydrin is used.

*Example 4*

The resin as made in any of the Examples is utilized in the form of a composition of 31.2 parts of the resin with approximately 0.1 part of stannic chloride. This material is spread onto aluminum metal sheets and No. 120 grade of abrasive sand sprinkled on the resulting tacky surface. Similarly, sheets of cardboard are coated with the adhesive resin and abrasive sand sprinkled on. A maple block likewise is coated with the adhesive so prepared and clamped against a glass plate. These three specimens are then cured at 130° C. for 15 hours. The abrasive grains become well bonded to both the aluminum and the cardboard sheet. When the maple block is pulled away from the glass plate, substantial failure in the glass occurs, showing the very excellent adhesion of the resin to glass.

It is to be understood that it is intended to cover all changes and modifications of the examples of the invention herein chosen for the purpose of illustration which do not constitute departures from the spirit and scope of the invention.

The invention claimed is:

1. In making a resin characterized by being liquid before curing and solid and substantially non-thermoplastic after curing in contact with an alkaline curing agent for epoxide resins, the process which comprises dissolving phenol in warm water in the proportion of at least 50 parts for 1 mole of the phenol, admixing acid in amount to reduce the pH at least as low as 2, introducing formaldehyde into the prediluted, warmed acidified phenol solution at a slow rate so that condensation of the formaldehyde with the phenol maintains the concentration of unreacted formaldehyde in the solution at all times at a level not above about 1% by weight, discontinuing the addition of formaldehyde when the proportion introduced is 0.3–0.9 mole for each mole of phenol, then neutralizing the acidity by the addition of an alkali, mixing the condensate so made with a chloroepoxyalkane selected from the group consisting of epichlorohydrin, alpha-glyceroldichlorohydrin, and 3-chloro-1,2-epoxybutane and with an alkali metal hydroxide in the proportion of at least 1 mole for each atom of chlorine to be converted to chloride, maintaining the mixture at an elevated temperature until reaction of the mixed materials is substantially complete, and then separating the by-product chloride salt from the resin so made.

2. The process of claim 1 which includes removal of unreacted phenol by steam distillation at reduced pressure from the said liquid condensate before reaction with the chloroepoxyalkane.

3. The process of claim 1 in which the chloroepoxyalkane is epichlorohydrin.

4. The process of claim 1 in which the chloroepoxyalkane is alpha-glycerol-dichlorohydrin.

5. The process of claim 1 in which the chloroepoxyalkane is 3-chloro-1,2-epoxybutane.

References Cited in the file of this patent

UNITED STATES PATENTS

| | | |
|---|---|---|
| 2,683,130 | D'Alelio | July 6, 1954 |
| 2,695,894 | D'Alelio | Nov. 30, 1954 |
| 2,716,099 | Bradley et al. | Aug. 23, 1955 |

FOREIGN PATENTS

| | | |
|---|---|---|
| 503,546 | Belgium | June 15, 1951 |
| 503,549 | Belgium | June 15, 1951 |

OTHER REFERENCES

"Hackh's Chemical Dictionary," Grant, 3rd edition, 1944, p. 310.